Figure 1:
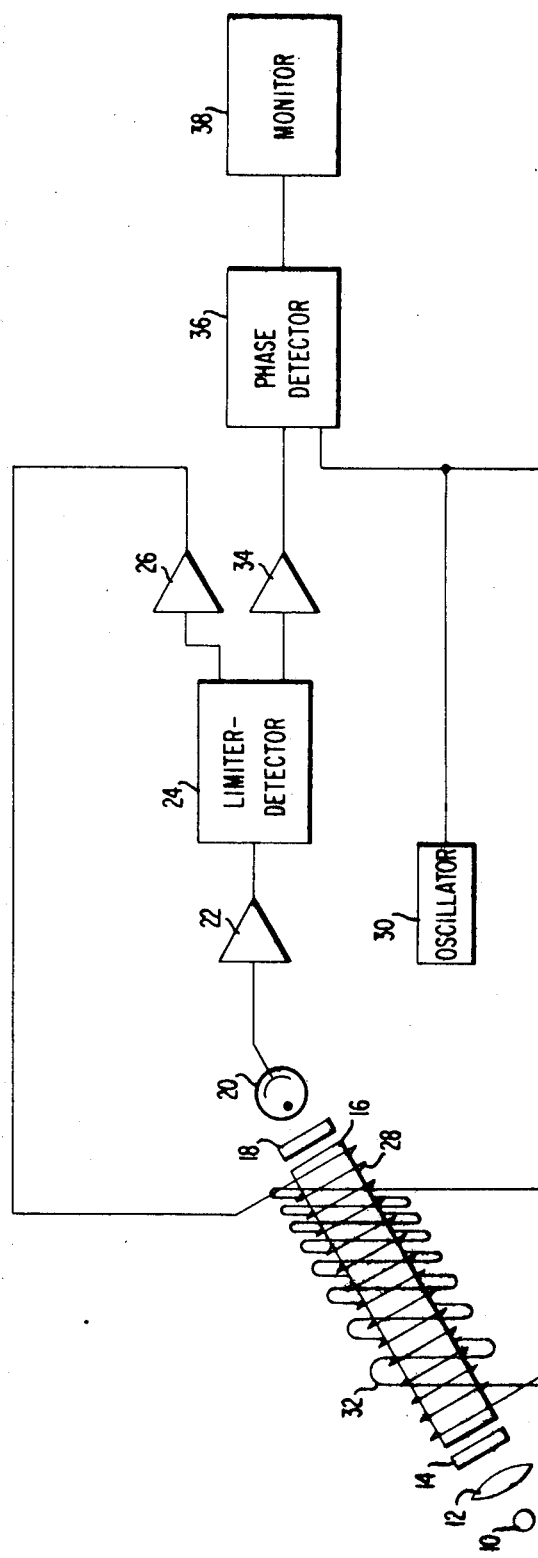

United States Patent

[11] 3,577,068

| [72] | Inventor | Richard C. La Force<br>Grosse Point, Mich. |
| --- | --- | --- |
| [21] | Appl. No. | 755,599 |
| [22] | Filed | Aug. 27, 1968 |
| [45] | Patented | May 4, 1971 |
| [73] | Assignee | Atlantic Richfield Company |

[54] OPTICALLY PUMPED MAGNETIC GRADIOMETER
7 Claims, 4 Drawing Figs.

| [52] | U.S. Cl. | 324/0.5 |
| --- | --- | --- |
| [51] | Int. Cl. | G01r 33/08 |
| [50] | Field of Search | 324/0.5 |
| | | (Lit.), 34 (Inquired) |

[56] References Cited
UNITED STATES PATENTS
3,443,209  5/1969  Nelson ......................... 324/0.5

*Primary Examiner*—Michael J. Lynch
*Attorney*—Morton, Bernard, Brown, Roberts & Sutherland ABSTRACT: Apparatus for determining the gradient of the earth's magnetic field over a zone. The absorption magnetometer is encircled by a coil of wire coupled to a low frequency oscillator. The turns of the coil are unevenly spaced along the length of the cell and are canted with respect to the cell so that the magnetic field caused by current in the coil is inhomogeneous and offsets the gradient in the earth's magnetic field. The magnetometer's radio frequency output signal is amplitude modulated by a signal having the frequency of the oscillator output and having an amplitude proportional to the gradient of the earth's magnetic field. This modulation signal is amplitude detected and then phase detected using the oscillator output as a reference. The phase detector output is a signal indicative of the earth's magnetic field gradient.

INVENTOR
RICHARD C. LAFORCE

OPTICALLY PUMPED MAGNETIC GRADIOMETER

A method frequently used in geophysical prospecting to determine the location of subterranean deposits is the monitoring of the earth's magnetic field. To permit this to be done in an economical manner on a large scale, airborne techniques are frequently utilized. In general these airborne techniques measure the earth's magnetic field with equipment mounted in an aerodynamic device, frequently termed a "bird," which is towed below and/or behind an aircraft to indicate the existence of magnetic anomalies. While a single such magnetometer can indicate changes in the ambient magnetic field, it is not possible to tell from the output of a single magnetometer whether those changes are due to subterranean deposits of interest or whether they are naturally occuring time variations. Such time variations include regular variations such as annual and lunar variations and the solar diurnal variation occurring every 24 hours. In addition to these, irregular time variations frequently occur in the earth's magnetic field.

By towing two magnetometers over an area, it is possible to determine whether changes in magnetic field intensity are the result of geophysical deposits or whether they are due to naturally occurring variations. If a magnetic field variation is detected simultaneously by the two magnetometers, it is assumed to be a naturally occurring variation. However, if one of the magnetometers detects the variation before the other, then it is assumed the variation is due to a subterranean deposit. However, even this method of magnetic gradient mapping is subject to error. The relative distance between the aircraft and the two birds, the angle of the aircraft relative to the birds, the positions of the birds relative to each other, and changes in any of these relationships can effect the readings. Furthermore, a noise signal occurring in one magnetometer but not in the other can result in an erroneous indication of a variation in the magnetic field.

The present invention is a magnetic field gradiometer utilizing a single optical absorption cell to measure the earth's magnetic field intensity over a zone modulated by a locally produced inhomogeneous magnetic field. The absorption cell of a self-oscillating optical magnetometer has its longitudinal axis inclined in the direction over which the magnetic field gradient is to be measured. A modulating current, having a frequency substantially below the magnetometer oscillation frequency, is passed through a coil of wire which encircles the absorption cell. The turns of this coil are not equally spaced, by instead are close together at one end and increasingly farther apart along the length of the cell. As a consequence, the radio frequency output of the magnetometer light detector is modulated by the low frequency modulating signal. The maximum excursion of this output modulation is proportional to the product of the earth's magnetic field gradient and the maximum amplitude of the inhomogeneous magnetic field caused by the current in the modulation coils. If during operation the current causing the inhomogeneous magnetic field is maintained at a constant amplitude, then the output is proportional to the earth's magnetic field gradient. This modulated radio frequency signal from the light detector is amplitude detected and amplified and is then applied to a phase detector which uses the initial modulating signal as a reference. The output from the phase detector is a direct current signal having a magnitude and sign proportional to the earth's magnetic field gradient along the length of the gas cell and a polarity indicative of the direction of the gradient.

Figure 2A:
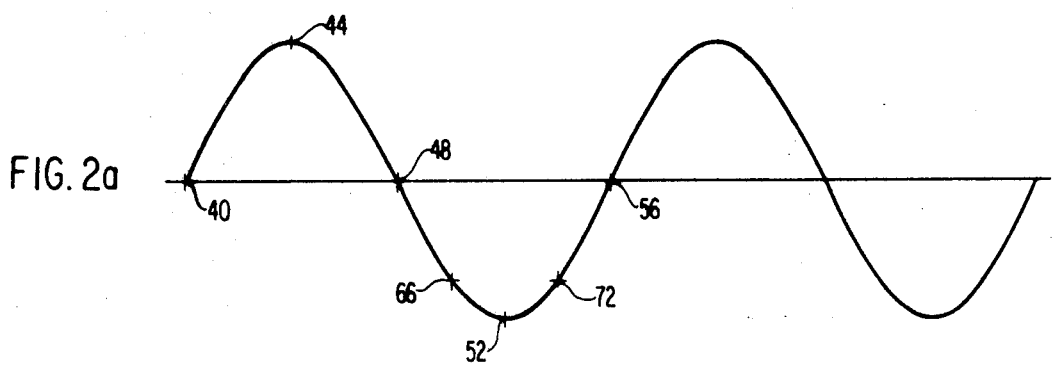
Figure 2B:
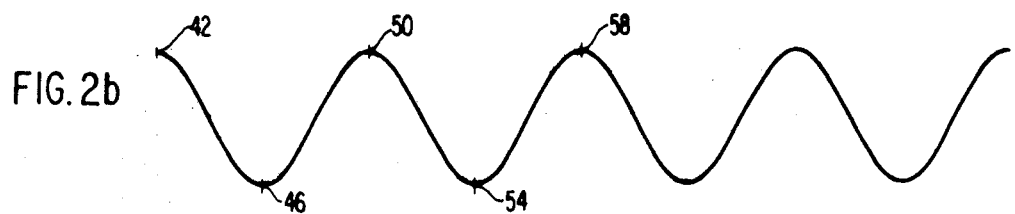
Figure 2C:
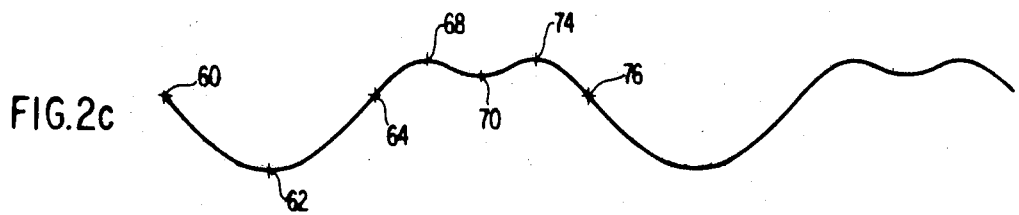

These and other features of the present invention will be more apparent from the following detailed description and claims, particularly when read in conjunction with the accompanying drawing in which:

FIG. 1 is a schematic representation of the present invention;

FIGS. 2A—2C depict waveforms useful in explaining operation of the invention.

In the drawing, the light from a helium lamp 10 passes through a lens 12, a circular polarizer 14, and into gas cell 16. Gas cell 16 is filled at a reduced pressure with a gas such as helium which is excited to a metastable state, for example by means of energizing electrodes (not shown). Cell 16 has its longitudinal axis in the direction in which the magnetic field gradient is to be measured, and so cell 16 might be inclined at an angle to the earth's surface. Cell 16 has a length in the order of one meter. The light emerging from gas cell 16 passes through filter 18 to light detector 20. Filter 18 is a radiation filter passing a selected wavelength, for example, the 1.08 $\mu$ wavelength of the helium lamp. This filtering improves the signal to noise ratio of the output from light detector 20. Light detector 20 must be able to detect light passing through filter 18. If this is infrared light having a wavelength of 1.08 $\mu$ then detector 20 must be sensitive to that wavelength and must be capable of responding to changes in light intensity occurring at frequencies up to 2 MHz. By way of example, light detector 20 might be a silicon photovoltaic detector such as an Electro-Nuclear Laboratories, Inc. Type 654 detector.

The output of light detector 20 is applied to a low-noise, linear, broad band, high-gain amplifier 22 which has its output connected to the input of limiter-detector 24. This limiter-detector limits the amplitude of the RF signal to a desired level and applies the RF output to power amplifier 26. The output of power amplifier 26 is connected to multiturn coil 28 which is wound closely around gas cell 16 in evenly spaced turns.

As is well known in the art, the apparatus 10—28 operates as a self-oscillating magnetometer when the proper feedback phase relationship is maintained between the energy reaching light detector 20 and the energy applied to coil 28. This magnetometer permits the determination of the magnetic field intensity by measurement of its frequency of oscillation, which is in the order of 1.5 MHz. If a gradient of the earth's magnetic field exists within the zone occupied by gas cell 16, then the magnetic field intensity over its one meter length is not uniform. This lack of uniformity is the magnetic field gradient to be determined. Because of this gradient, oscillation of the apparatus does not occur at a sharply defined frequency, but instead takes place within a frequency band.

Oscillator 30 provides an output of a frequency substantially below the frequency of the self-oscillating magnetometer, for example, a frequency in the order of 1000 Hz. The output of oscillator 30 is applied to coil 32 which is wound around gas cell 16 and coil 28. The turns of coil 32 are not evenly spaced along the cell 16, being wound more closely at one end than at the other. The alternating current applied by oscillator 30 to coil 32 causes an alternating magnetic field within gas cell 16. Since coil 32 is not wound in uniformly spaced turns, this locally produced alternating magnetic field is inhomogeneous, having a substantially uniform gradient over the length of cell 16. The locally produced field combines with the earth's magnetic field over the length of cell 16. As a consequence, the signal applied by light detector 20 to amplifier 22 is a radio frequency signal which is amplitude modulated at the frequency of the locally produced field. The amplitude of this modulation is proportional to the product of the earth's magnetic field gradient and the maximum excursion of the locally produced inhomogeneous magnetic field caused by the current in coil 32. By maintaining the current in coil 32 constant, the modulation amplitude is made proportional to the earth's magnetic field gradient.

The limiting action of limiter-detector 24 removes the amplitude modulation signal from the radio frequency signal applied to power amplifier 26. Limiter-detector 24 applies the low frequency modulating signal to narrow band amplifier 34 which has its output connected to one input of phase detector 36. The output of oscillator 30 is connected to the other input of phase detector 36 so that the modulating signal in the output of the light detector 20 is phase detected using the modulating signal from oscillator 30 as a reference. The resulting output from phase detector 36 is a DC signal having an amplitude proportional to the earth's magnetic field gradient over the gas cell 16 and having a polarity indicative of the direction of that gradient. The output of phase detector 36 can be applied to a monitor 38 which, by way of example, might be an oscillograph or a meter.

A more detailed understanding of the operation of the gradiometer is as follows. Gas cell 16 is influenced by both the earth's magnetic field gradient over the length of the gas cell and the locally produced magnetic field gradient due to the current in coil 32. At some level of current in coil 32 the locally produced gradient exactly offsets the earth's magnetic field gradient over the length of cell 16. By applying an alternating current to coil 32 the net magnetic field gradient over the length of cell 16 is swept from a value of zero, at the point at which the locally produced gradient exactly offsets the earth's gradient to a maximum value. The absorption of radiation within cell 16 is inversely related to the net magnetic field gradient over the length of cell 16. Consequently, when there is zero net magnetic field gradient over the length of cell 16, the output of light detector 20 is a maximum.

Consider as a first example, the limiting case in which there is no earth's magnetic field gradient over the length of cell 16. FIG. 2A depicts the alternating current in coil 32 which causes an alternating net magnetic field gradient over the length of cell 16. As a result the radio frequency output of light detector 20 is modulated by a signal which varies as depicted in FIG. 2B. When the current in coil 32 is zero, at point 40, the modulation output of detector 20 is a value depicted at point 42. When the current in coil 32 passes through its sinusoidal maximum at point 44, the modulation output of detector 20 passes through a minimum at point 46. When the current in coil 32 reaches zero at point 48, the modulation output of detector 20 is at point 50, the same as its initial level at point 42. The current in coil 32 then decreases to its sinusoidal minimum at point 52 and the modulation output of detector 20 again decreases to a minimum at point 54, the same level as the previous minimum at point 46. When the current in coil 32 is again at zero, at point 56, the detector 20 modulation output is again at its maximum at point 58. In this limiting case of zero earth's magnetic field gradient over the length of cell 16, then, the output of detector 20 is a radio frequency signal modulated by a signal at twice the frequency of the current applied to coil 32 from oscillator 30. Limiter-detector 24 removes the modulation signal from the radio frequency signal in the output of amplifier 22 and applies that modulation signal to phase detector 36 which also receives the output from oscillator 30. Phase detector 36 is responsive only to the frequency of the signal from oscillator 30, and so the phase detector does not respond to the output of light detector 20 at twice that frequency. In this limiting case then, phase detector 36 has zero output, indicating that the earth's magnetic field gradient over the length of cell 16 is zero.

Next consider the situation in which over the length of cell 16 a positive earth's magnetic field gradient exists with respect to some arbitrary reference, and assume that as the current in coil 32 increases from zero, the locally produced gradient adds to the earth's gradient so that the net gradient over cell 16 increases. The modulation output of detector 20 is then depicted in FIG. 2C. As the current in coil 32 increases from its zero value at point 40, the modulation output of detector 20 decreases from its initial value at point 60. The sinusoidal current in coil 32 passes its maximum at point 44 and returns toward zero, and simultaneously the modulation output of detector 20 passes its minimum at point 62 and increases. When the current in coil 32 passes through zero at point 48 and becomes negative, the modulation output of detector 20 passes its original value at point 64 and continues to increase until the current in coil 32 reaches the value at point 66 at which the locally produced magnetic field gradient exactly offsets the earth's magnetic field gradient over the length of cell 16, resulting in maximum modulation output from detector 20, as depicted at point 68. The current in coil 32 continues to decrease until it reaches its sinusoidal minimum at point 52. The modulation output of detector 20 decreases during this time, reaching a valley at point 70. As the current in coil 32 increases to the value at point 72 at which the locally produced gradient again exactly offsets the earth's gradient, the modulation output of detector 20 again increases to its maximum value at point 74. As the current in coil 32 continues to increase to zero at point 56, the modulation output from detector 20 decreases to its initial value at point 76. This cycle repeats. Thus, the modulation output of detector 20 is made up of a first component in the form of a sine wave at the frequency of the output of oscillator 30 and second component in the form of a harmonic of that sine wave. The maximum value of the output from detector 20 occurs when the locally produced magnetic field gradient exactly offsets the earth's magnetic field gradient over the length of cell 16. This modulation signal is detected by limiter-detector 24 and applied to phase detector 36 which detects the component at the same frequency as the output from oscillator 30. Phase detector 36 therefore provides a signal indicative of the maximum amplitude of points 68 and 74 and of the phase relationship of that signal with respect to the output of oscillator 30. This output from phase detector 36 is thus indicative of the current in coil 32 at the time the locally generated magnetic field gradient exactly cancels the earth's magnetic field gradient.

While the description of the present invention has been with reference to a preferred embodiment, numerous modifications and substitutions could be made. For example, the magnetometer could include a separate radio frequency source rather than being self-oscillating. In addition, although a helium lamp and a helium-filled gas cell have been disclosed as the radiation source and the radiation absorption cell, other radiation sources and absorption cells could be utilized and still be within the scope of the invention.

I claim:

1. Apparatus for determining the gradient of the earth's magnetic field over a zone, said apparatus comprising:
   a. an optical magnetometer having a longitudinal axis and positioned in said zone and including aligned along said longitudinal axis a source of radiation, a radiation absorption cell adapted for passage therethrough of radiation from said source, and radiation detection means for producing an output proportional to the intensity of radiation impinging thereon;
   b. means for generating a varying local magnetic field gradient around said magnetometer to cyclically vary the net magnetic field gradient over said zone; and
   c. circuit means coupled to said radiation detection means for measuring the magnitude of said local magnetic field gradient at the point at which that local magnetic field gradient exactly offsets the earth's magnetic field gradient over said zone to indicate the gradient of the earth's magnetic field over said zone.

2. Apparatus as claimed in claim 1 in which said generating means includes an oscillator providing an output of substantially low frequency coupled to a coil encircling said magnetometer with nonuniformly spaced turns canted with respect to the longitudinal axis of said magnetometer.

3. Apparatus as claimed in claim 2 in which said circuit means includes means for separating said radiation detection means output into a high frequency component and a low frequency component, said low frequency component having substantially the same frequency as said oscillator output and having an amplitude proportional to the earth's magnetic field gradient over said zone.

4. Apparatus as claimed in claim 3 in which said magnetometer includes a coil coupled to said separating means for utilizing said high frequency component to make said magnetometer self-oscillating.

5. Apparatus as claimed in claim 3 in which said circuit means includes means for phase detecting said low frequency component with respect to said oscillator output.

6. Apparatus as claimed in claim 5 in which said source of radiation is a helium lamp and said radiation absorption cell is filled with helium.

7. Apparatus as claimed in claim 5 further comprising means for indicating the output of said phase detecting means.